Figure 5:
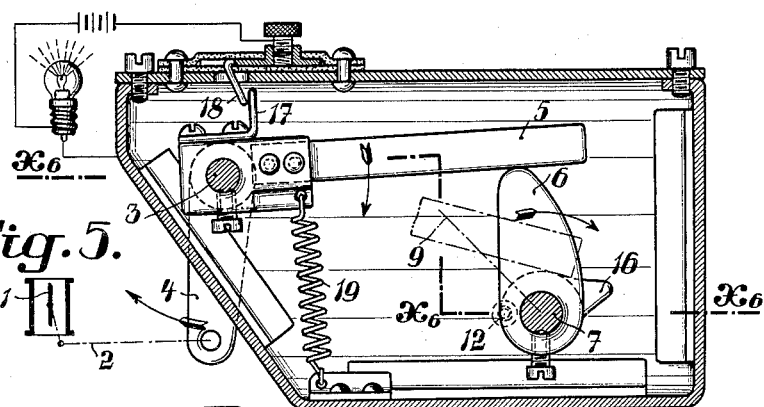

Nov. 12, 1935. A. ABRAMSON ET AL 2,020,758
COMBINED BRAKE AND THROTTLE CONTROL MECHANISM
Filed March 20, 1933 5 Sheets-Sheet 1
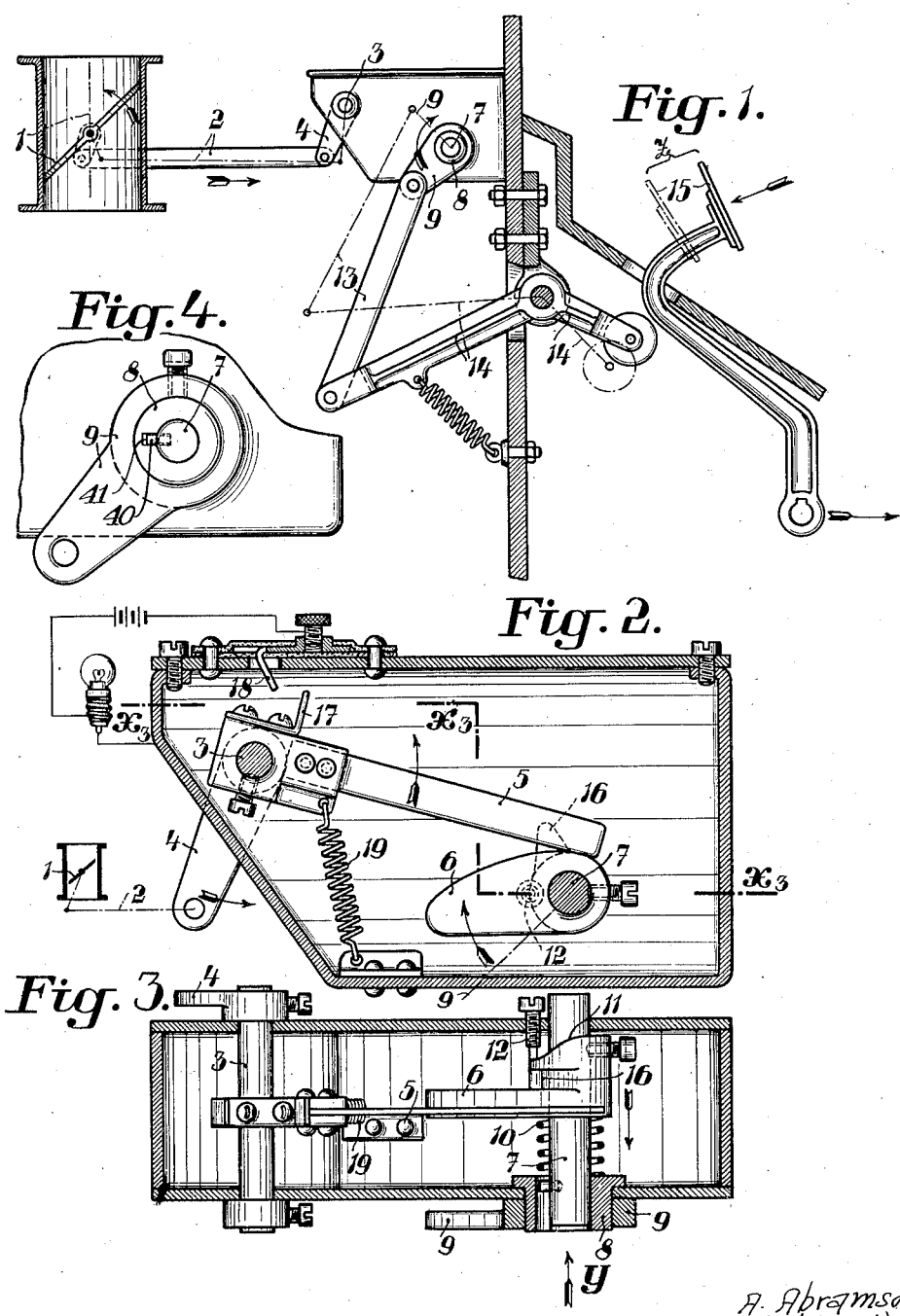

Nov. 12, 1935.  A. ABRAMSON ET AL  2,020,758
COMBINED BRAKE AND THROTTLE CONTROL MECHANISM
Filed March 20, 1933  5 Sheets-Sheet 2

A. Abramson
P. Novak
INVENTORS

By: Marks & Clark
ATTYS.

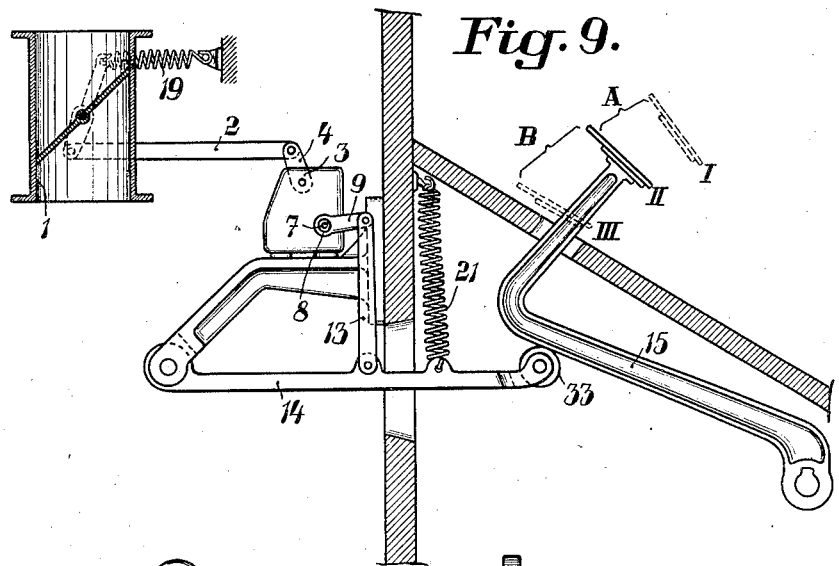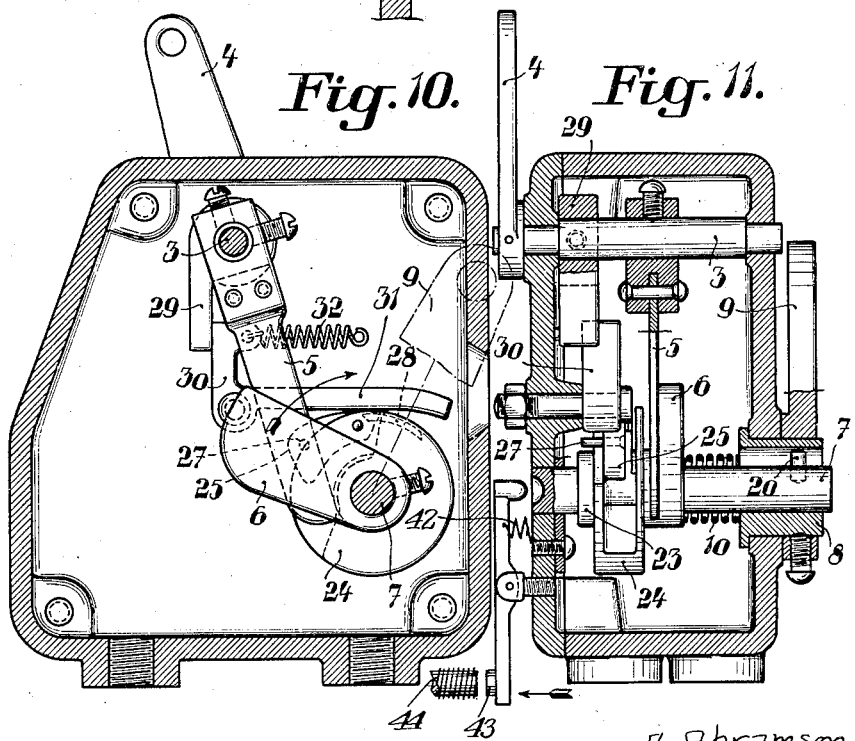

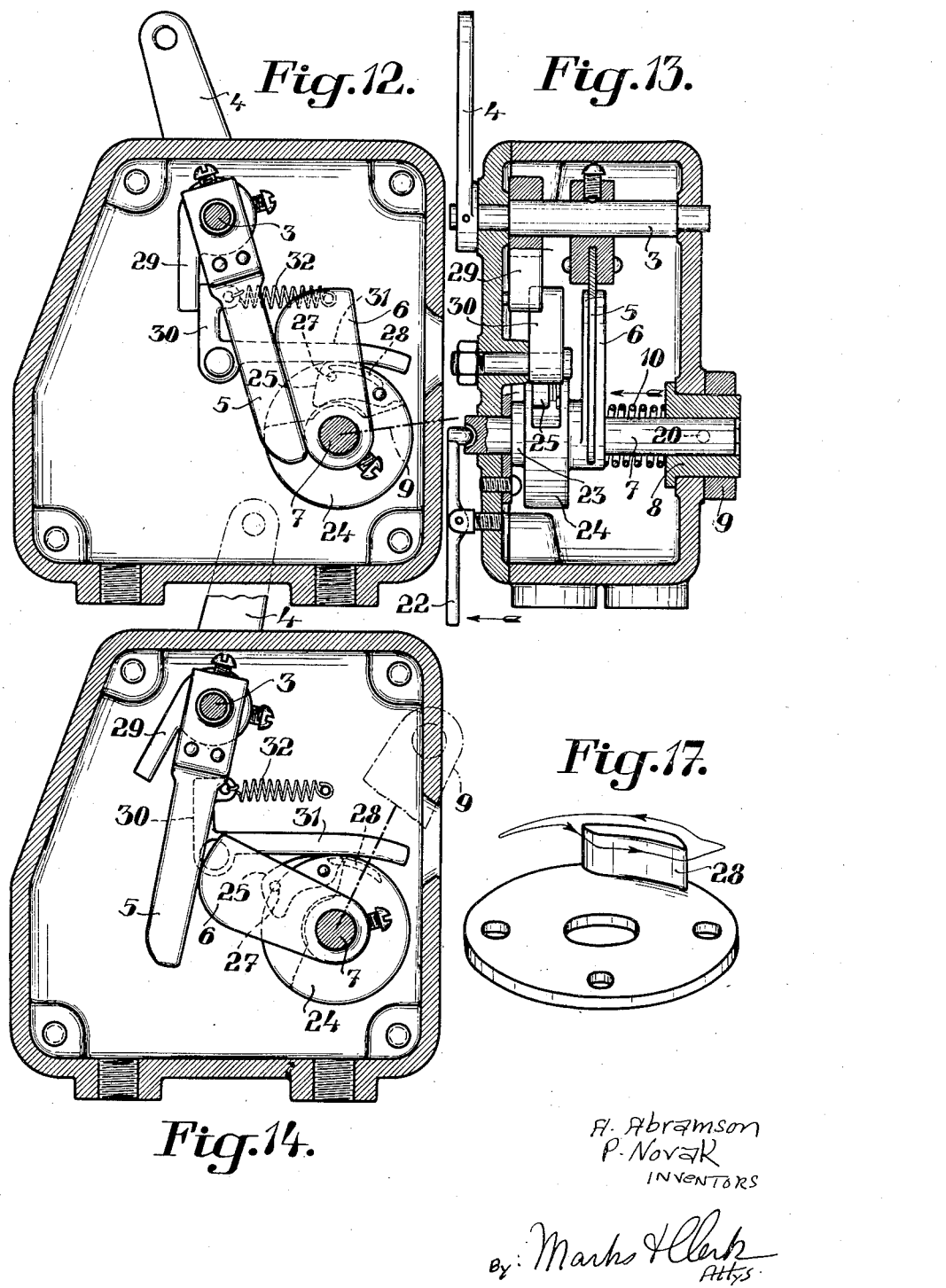

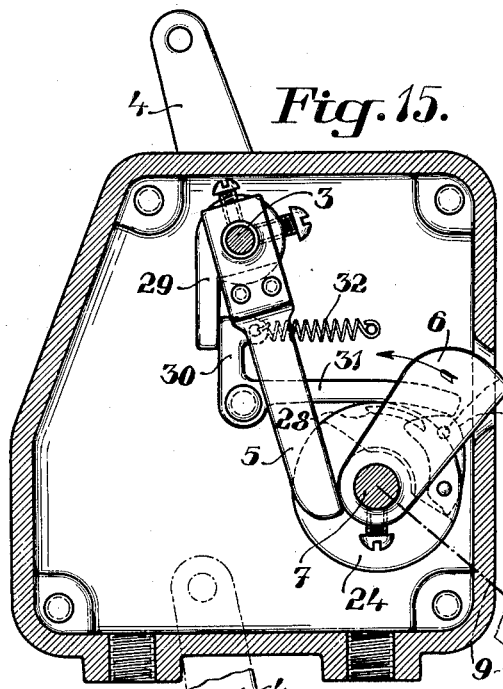
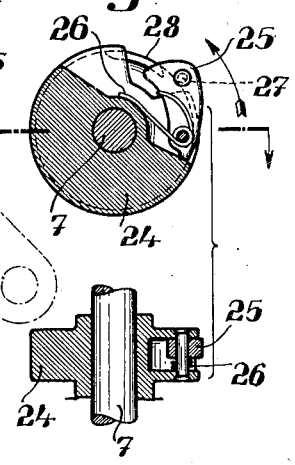
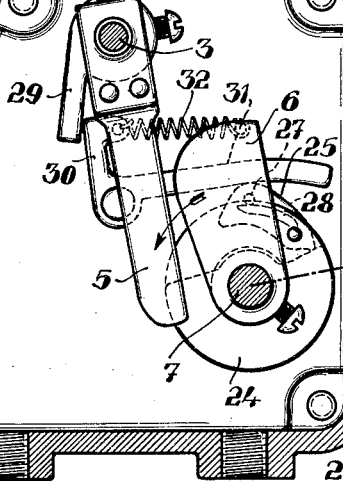
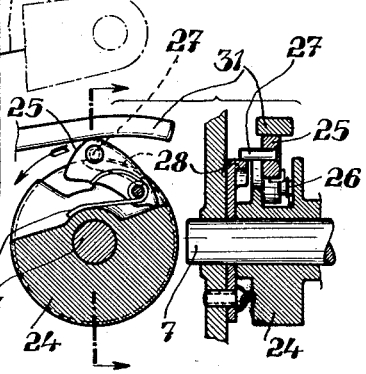

Patented Nov. 12, 1935

2,020,758

UNITED STATES PATENT OFFICE 2,020,758

COMBINED BRAKE AND THROTTLE CONTROL MECHANISM

Alexander Abramson and Pavel Novák, Prague, Czechoslovakia

Application March 20, 1933, Serial No. 661,863
In Czechoslovakia September 20, 1932

6 Claims. (Cl. 192—3)

It is known to operate an automobile vehicle brake and the throttle valve of the carbureter of the motor by means of a common pedal, in such a way that in the first portion of the working stroke of the pedal, which extends from the initial position of the pedal to the position corresponding to the application of the brakes, only the throttle valve of the carbureter is actuated. In the case of this known apparatus the ranges of action of the pedal upon the throttle valve of the carbureter and upon the brakes are separated from one another by a short idle motion of the pedal, in such a way that during the movement of the pedal for the purpose of releasing the brakes, that is to say, during the return of the pedal into its initial position, a condition arises in which the brakes are completely released and the throttle valve is still closed. This condition, which is disadvantageous for starting, particularly uphill, is precluded according to the present invention, which consists essentially in the fact that the pedal, during its entire stroke, beginning from its initial position or back to the latter, is kept in positive operating relationship with the mechanism which acts upon the throttle valve. This mechanism is so constructed that the sharp separation of the range of action of the pedal on the one hand upon the throttle valve of the carbureter and on the other hand upon the brake, is only maintained in the direction of the stroke of the pedal from its initial position to the position corresponding to the application of the brakes, whereas during the stroke of the pedal in the opposite direction, that is to say, towards the initial position, the pedal acts simultaneously upon the brake and the throttle valve before it passes into that part of its range of action which is provided for the throttle valve only. The advantage is thereby obtained that before the brakes are completely released fuel is supplied to the motor, as a result of which the vehicle can be reliably started, particularly up hill.

Two forms of the construction of the apparatus are illustrated in the accompanying drawings, in which Figure 1 shows a general view of the first constructional form, Figure 2 a sectional elevation thereof on a larger scale with the throttle valve closed, Figure 3 a section on the line $x_3$—$x_3$ in Fig. 2.

Figure 6:
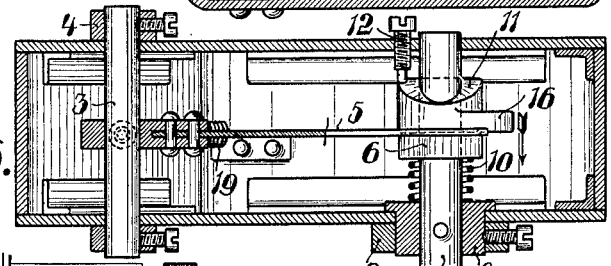
Figure 7:
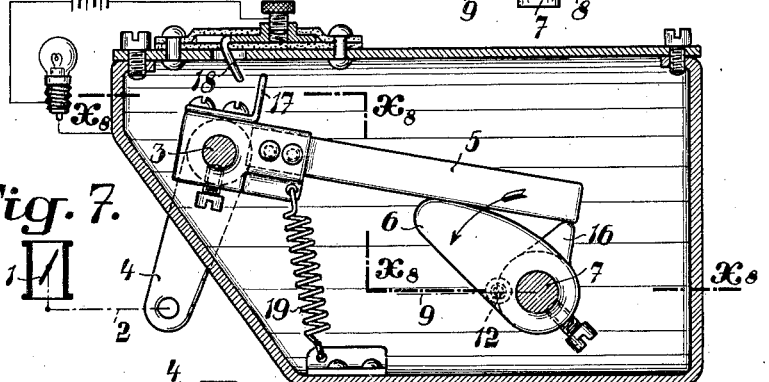
Figure 8:
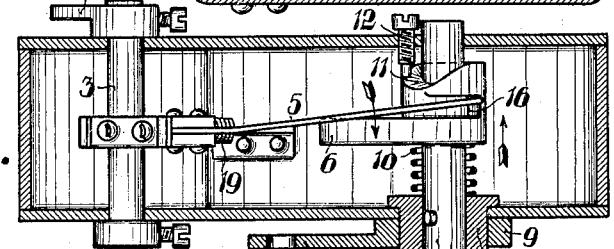

Figure 4 is a partial elevation view looking in the direction of the arrow $y$ in Figure 3, Figures 5 and 7 are sectional elevations similar to Fig. 2 but with the parts in different positions, and Figures 6 and 8 are sections on the lines $x_6$—$x_6$ and $x_8$—$x_8$ in Figures 5 and 7 respectively.

Figure 9 shows the general arrangement of the second constructional form of the invention in elevation, Figure 10 is a side view on a larger scale of mechanism interposed between the pedal and the rodding that actuates the throttle valve, in the position of rest, Figure 11 is a corresponding end view thereof, Figures 12 and 13 are views similar to Figs. 10 and 11 showing the mechanism with the throttle valve closed, which can now be adjusted by the pedal into its working range intended for this purpose, right to maximum opening, Figure 14 shows the mechanism with maximum opening of the throttle valve, Figure 15 with the brake firmly applied, and Figure 16 in an intermediate position during the releasing of the brake, Figures 15a, 16a and 17 illustrate details to which further reference will be made in the course of the description.

In the form of construction illustrated in Figs. 1 to 8, the throttle valve 1 is connected by a rod 2 with a lever 4 mounted fast upon a shaft 3. Upon the shaft 3, which is rotatably journalled in a casing, is mounted fast a resilient arm 5, which can yield in an axial direction. A spring 19 attached to this arm tends to keep the throttle valve 1 in the closed position, with the arm 5 pressing upon a cam 6. The cam 6 is mounted fast upon a shaft 7, which is so supported in the casing as to be displaceable in an axial direction, and which passes through a bush 8, which is rotatably supported in the casing wall, and with which an arm 9 is fixedly connected. The shaft 7 participates in the rotation of the bush 8, since a shaft pin 40 is guided in a groove 41 in the bush, as shown in Figure 4. The arm 9 is connected by a rod 13 with a spring-controlled two-armed lever 14, upon which the brake pedal 15 acts.

A helical spring 10 surrounding the shaft 7, keeps an inclined surface 11 of a cam hub pressed against a stationary pin 12, which is offset to a smaller cross section at its lower end.

In the position of the individual parts illustrated in Figures 1 and 2, the throttle valve 1 is closed, and the brakes are out of action. The stroke of the pedal 15 from the initial position within the range $z$ only acts upon the throttle valve 1, as the position of the cam 6, and therefore of the arm 5, determines the position of the throttle valve. It is to be observed that the cam 6 is so wide that during the movements of the pedal 15 within the range z it pushes the arm 5 away from the closed position of the throttle valve to the position of maximum opening, notwithstanding the fact that the cam shaft is displaced by co-operation of the inclined surface 11 with the pin 12.

When the pedal is moved beyond the range z, that is to say, beyond the limiting position shown in Figure 5, which corresponds to maximum opening of the throttle valve 1, the arm 5 slips off the cam 6 into the dotted-line position (Fig. 5), resting on the cylindrical hub of the cam 6, so that the throttle is closed, and there commences that part of the range of action of the pedal 15 which influences the brakes.

During the return stroke of the pedal for the purpose of releasing the brakes, the arm 5, as the cam 6 (Fig. 7) rotates backwards, comes into contact with a tooth 16 on the cam hub, and is raised so far that it slips back out of its deflected position, shown in Figure 8, on to the cam 6, and partially opens the throttle valve transiently, before the brakes are completely released.

In order to indicate to the driver that the pedal 15 is located at the limit of the range z, and that in the event of any further movement of the pedal the throttle valve 1 will automatically assume its closed position, and the brakes will be actuated, a signal may be given automatically, preferably by means of an electric circuit 17, 18, as shown in the drawings.

The form of construction illustrated in Figs. 9 to 16a is distinguished from the form hereinbefore described by the fact that the mechanism that acts upon the rodding of the throttle valve is so constructed that the position of the pedal corresponding to closure of the throttle valve is located at a point between the limits of the pedal stroke, while the position of the pedal corresponding to maximum opening of the throttle valve corresponds to the initial position of the pedal. The advantage is thereby obtained that the pedal passes through the position corresponding to closure of the throttle valve into the working range that influences the brake, as a result of which the brakes can be applied with the motor shut down. Even during the return stroke of the pedal, within the working range thereof that influences the brakes, the throttle valve is already partially opened, and is maintained in this position until the pedal passes over into that part of its working range which influences the throttle valve, so that on the one hand the releasing of the brakes is accompanied by a steady partial supply of gas, and on the other hand the latter can be increased to a maximum without interruption. This results in smooth and shockless starting even up hill.

The parts of the mechanism hereinafter described, which corresponds to the form of construction described above, are denoted by the same reference numerals.

The mechanism, which is lodged in a suitable casing, is moved by a shaft 7, which is axially displaceable and rotatable in the casing.

One end of the shaft 7 is axially guided by means of a pin 20 in a groove in a bush 8 rotatably supported in the wall of the casing, a lever 9 being secured to this bush. This lever is pivoted by a link 13 to a rotatably supported lever 14 influenced by a spring 21, the free end of this lever carrying a roller 33 and being kept pressed against the pedal 15. The rotation of the shaft 7 in one direction or the other is transmitted by means of a device, to be hereinafter described, to the shaft 3, which is rotatably mounted in the casing, and which, by means of the rodding 4, 2, adjusts the throttle valve 1 into any particular position desired.

According to the invention the pedal 15 must act in the range A of its stroke upon the rodding of the throttle valve alone, and in the range B of its stroke, that is, from the commencement of the release of the brakes, upon the throttle valve also, and this action must be maintained until it has entered the range A, in order that when the brake is completely released the supply of gas then effected can be increased without interruption to the maximum.

The part of the mechanism that acts upon the rodding of the throttle valve alone in the stroke range A of the pedal consists of the cam 6 and the lever arm 5, which are mounted fast upon the shafts 7 and 3 respectively.

When the vehicle is at rest with the brakes completely released, the pedal 15 occupies the position I, which corresponds to the maximum opening of the throttle valve. The mutual interaction of the cam 6 and the lever arm 5 must be prevented in the garage for instance. This is effected by displacing the shaft 7 laterally against the action of the spring 10 by engageable positive means, so that the cam 6 slips away from underneath the lever arm 5, and the latter, in consequence of a spring 19 interposed in the rodding, can assume the position illustrated in Figures 10 and 11, in which it bears against the side surface of the cam 6. This position corresponds to closure of the throttle valve. The engageable positive actuation hereinbefore mentioned may be effected at will by means of a lever 22, which acts upon the end of the shaft 7, and which may for instance be electrically controlled. For instance as shown in Figure 11, the lever 22 may be held in its normal position by a compression spring 42. On the lever 22 there is an armature 43, which is attracted when the winding of an electro-magnet 44 is energized by closing a circuit, thereby shifting the shaft 7 towards the right. This shaft 7 is now maintained in its position by virtue of the side of the lever 5 bearing against the side surface of the cam 6 and thereby preventing the spring 10 from returning the cam 6 and the shaft 7 towards the left. When the circuit is interrupted the lever 22 resumes its normal position as shown in Figure 11.

In order to adjust the mechanism to "gas", the pedal 15 is to be moved in the direction of the brake-actuating stroke into the position II, as a result of which the cam 6 is rotated relatively to the stationary lever arm 5 in the direction of the arrow in Fig. 10 into the position shown in Figure 12, in such a way that the end faces of the cam 6 and of the lever arm 5 are side by side in staggered relationship. The spring 10 can therefore come into action and displace the shaft 7 so far towards the left, that the working surface of the cam 6 bears against the lever arm 5. The displacement of the shaft 7 is limited by its boss 23 coming into contact with the wall of the casing.

The mechanism is now adjusted for influencing the rodding of the throttle valve, which can be opened by moving the pedal in the direction towards the initial position I right to a maximum, shown in Figure 14. This influencing of the throttle valve is caused by the rodding 9, 13 and 14 being held in operative relationship with the pedal 15 by the spring 21, as shown in Figure 9.

In order to let the pedal 15 act upon the brakes, it must be moved beyond the position II, that is, beyond the position corresponding to closure of the throttle valve, into the working gauge B. So long as it is a question of gentle braking, the movement of the pedal is without action upon the throttle valve rodding, which has come to rest, because the operative connection between the cam 6 and lever 5 is disconnected in the aforementioned manner, the lever 5 lying at rest on the hub-like part of the cam 6, and so during the release of the brake gas is only supplied when the pedal, in its return stroke, has passed beyond the position II. If, however, the vehicle is standing on a hill, and it is necessary to apply the brakes firmly, an auxiliary mechanism, likewise acting upon the rodding of the throttle valve, is brought into the working position in the corresponding position of the pedal.

This auxiliary mechanism consists of a disc 24 mounted fast upon the shaft 7 and having a peripheral notch, in which is rotatably mounted a pawl 25, which is pressed outwards by a spring 26. On the pawl 25 is mounted fast a pin 27, which can slide on the outside and inside of a tooth 28, fixed to the wall of the casing, shown in Fig. 17, having a curvature concentric with the shaft.

Furthermore there is secured upon the shaft 3 a short arm 29, within range of which there projects one arm 30 of a bell-crank lever 30, 31 pivoted in the casing. The second arm 31 of this bell-crank lever is pressed by the action of a spring 32 against the pawl 25. Now this auxiliary mechanism acts in the following manner:—

If the pedal 15 is moved so far as to apply the brakes firmly, the pin 27 of the pawl 25 glides on the inside of the tooth 28 until it leaves the latter (Figs. 15 and 15a), and then the pawl 25, in consequence of the action of the spring 26, springs outwards against the lever arm 31. This path along the tooth 28 is indicated in Figure 17 by arrows.

It is easy to see that now, from the commencement of the release of the brake onwards, "gas" is already supplied, since, during return rotation of the shaft 7, the pawl 25 shifts the lever arm 31, and the latter acts upon the rodding of the throttle valve by means of the lever arm 30 and the arm 29. This action corresponds to a position of the throttle valve which is sufficiently wide open for starting, since the lever arm 31 cannot rock the arm 29 further by means of the pin 27 sliding upon the external surface of the tooth 28, or by means of the pawl 25 thereby relatively held fast.

In Figures 16 and 16a is illustrated that position of the auxiliary mechanism which approximately corresponds to the position II of the pedal. Hence if during the releasing stroke the pedal is already located within the working range A, the pin leaves the tooth 28, the lever 30, 31 can follow the action of the spring 32, and its action upon the short arm 29 ceases, whereas the cam 6 has already struck against the lever arm 5 located in the "starting gas" position, and effects from there onwards the influencing of the rodding of the throttle valve by means of the pedal moving within the working range A.

What we claim is:—

1. In a gasoline motor vehicle, means for operating the vehicle brake and the carbureter throttle valve of the motor, comprising a pedal, mechanism actuated by the first part of the depression stroke of the pedal for actuating the throttle valve, and means actuated by a succeeding part of the depression stroke of the pedal, after actuation of the throttle valve has ceased, for actuating the brake, and the mechanism that actuates the throttle valve being adapted to open the throttle valve automatically for a moment during the return stroke of the pedal before the brake is completely released.

2. In a gasoline motor vehicle, means for operating the vehicle brake and the carbureter throttle valve of the motor, comprising a pedal, mechanism actuated by the first part of the depression stroke of the pedal for actuating the throttle valve, and means actuated by a succeeding part of the depression stroke of the pedal, after actuation of the throttle valve has ceased, for actuating the brake, the valve-actuating mechanism comprising a valve rod for opening and closing the throttle valve, a valve lever acting directly upon the valve rod, and a double cam adapted to be rotated and controlled by the pedal, one element of the cam acting upon the valve lever during the depression stroke of the pedal and the other element of the cam acting upon the valve lever during the return stroke of the pedal.

3. In a gasoline motor vehicle, means for operating the vehicle brake and the carbureter throttle valve of the motor, comprising a pedal, mechanism actuated by the first part of the depression stroke of the pedal for actuating the throttle valve, and means actuated by a succeeding part of the depression stroke of the pedal, after actuation of the throttle valve has ceased, for actuating the brake, the pedal being kept in positive operative relationship with the means for actuating the throttle valve throughout the whole of its depression and return strokes, and the mechanism that actuates the throttle valve being adapted to keep the throttle valve open to a maximum extent in the initial position of the pedal, so that the part of the pedal stroke that actuates the brake begins when the pedal passes beyond the position corresponding to closure of the throttle valve.

4. In a gasoline motor vehicle, means for operating the vehicle brake and the carbureter throttle valve as claimed in claim 3, further comprising means for causing the part of the pedal stroke that influences the brake from the beginning of the releasing movement thereof onwards to be extended to the mechanism that actuates the throttle valve.

5. In a gasoline motor vehicle, means for operating the vehicle brake and the carbureter throttle valve of the motor, comprising a pedal, mechanism actuated by the first part of the depression stroke of the pedal for actuating the throttle valve, and means actuated by a succeeding part of the depression stroke of the pedal, after actuation of the throttle valve has ceased, for actuating the brake, the mechanism that actuates the throttle valve comprising a casing, a valve lever fulcrumed in the casing for opening and closing the throttle valve, a shaft rotatable and longitudinally displaceable in the casing, with one end projecting to the outside of the casing, a cam secured to the shaft and adapted to rock the valve lever when the shaft is rotated, and a lever outside the casing adapted to displace the shaft longitudinally to such an extent as to withdraw the cam from the valve lever.

6. In a gasoline motor vehicle, means for operating the vehicle brake and the carbureter throttle valve of the motor, comprising a pedal, mechanism actuated by the first part of the depression stroke of the pedal for actuating the throttle valve, and means actuated by a succeeding part of the depression stroke of the pedal, after actuation of the throttle valve has ceased, for actuating the brake, and mechanism that actuates the throttle valve comprising a casing, a valve lever fulcrumed in the casing for opening and closing the throttle valve, a shaft journaled in the casing, a cam secured to the shaft and adapted to rock the valve lever when the shaft is rotated, a pivoted pawl mounted on the shaft, and auxiliary rod and lever mechanism for actuating the throttle valve, the pawl being adapted to engage automatically against the auxiliary rod and lever mechanism when the brake is firmly applied and to shift this mechanism to effect a partial constant opening of the throttle valve from the beginning of the brake-releasing stroke of the pedal onwards, and the pawl being further adapted to disengage automatically from the auxiliary rod and lever mechanism when the pawl, upon the return stroke of the pedal, reaches the point at which the actuation of the throttle valve begins.

ALEXANDER ABRAMSON.
PAVEL NOVÁK.